United States Patent
Xu et al.

(10) Patent No.: US 10,652,785 B2
(45) Date of Patent: May 12, 2020

(54) METHOD AND APPARATUS FOR ENHANCING MOBILITY FOR 3GPP LTE-WLAN AGGREGATION IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/395,936

(22) Filed: Apr. 26, 2019

(65) Prior Publication Data

US 2019/0253936 A1  Aug. 15, 2019

Related U.S. Application Data

(63) Continuation of application No. 15/473,201, filed on Mar. 29, 2017, now Pat. No. 10,313,933.

(Continued)

(51) Int. Cl.
*H04W 36/00* (2009.01)
*H04W 36/08* (2009.01)
(Continued)

(52) U.S. Cl.
CPC ... *H04W 36/0016* (2013.01); *H04W 36/0055* (2013.01); *H04W 36/0069* (2018.08);
(Continued)

(58) Field of Classification Search
CPC .............. H04L 43/0811; H04W 16/14; H04W 36/0016; H04W 36/0055; H04W 36/08;
(Continued)

(56) References Cited

U.S. PATENT DOCUMENTS 8,121,052 B2  2/2012  Zheng et al.
8,743,829 B2  6/2014  Guan et al.
(Continued)

FOREIGN PATENT DOCUMENTS

CN  102036325  6/2013
CN  105191403  12/2015
(Continued)

OTHER PUBLICATIONS

European Patent Office Application Serial No. 17163824.0, Search Report dated Sep. 4, 2017, 15 pages.

(Continued)

*Primary Examiner* — Eric Nowlin
(74) *Attorney, Agent, or Firm* — Lee Hong Degerman Kang Waimey

(57) ABSTRACT

As one aspect of mobility enhancement of 3rd generation partnership project (3GPP) long-term evolution (LTE)-wireless local area network (WLAN) aggregation, inter-eNodeB (eNB) handover without WLAN termination (WT) change is considered. A source eNB transmits a handover request message including a WT identifier (ID) and WT XwAP ID to a target eNB. The target eNB transmits a WT addition request message including the WT XwAP ID to a WT, and receives a WT addition request acknowledge message from the WT. The target eNB transmits a handover request acknowledge message indicating that a WT is kept to the source eNB. The source eNB transmits a WT release request message indicating that the WT is kept to the WT. The WT is a logical node that terminates a Xw interface on a WLAN.

6 Claims, 9 Drawing Sheets

Related U.S. Application Data

(60) Provisional application No. 62/317,416, filed on Apr. 1, 2016, provisional application No. 62/363,856, filed on Jul. 19, 2016.

(51) Int. Cl.
  *H04W 76/16* (2018.01)
  *H04W 88/06* (2009.01)
  *H04W 84/12* (2009.01)

(52) U.S. Cl.
  CPC ............ *H04W 36/08* (2013.01); *H04W 76/16* (2018.02); *H04W 84/12* (2013.01); *H04W 88/06* (2013.01)

(58) Field of Classification Search
  CPC ... H04W 76/026; H04W 76/16; H04W 84/12; H04W 88/06; H04W 88/08
  See application file for complete search history.

(56) References Cited

U.S. PATENT DOCUMENTS

| | | | |
|---|---|---|---|
| 8,831,612 | B2 | 9/2014 | Kim et al. |
| 9,173,152 | B2 | 10/2015 | Kim et al. |
| 9,420,501 | B2 | 8/2016 | Lei et al. |
| 9,801,067 | B1 | 10/2017 | Hsieh |
| 2011/0294509 | A1 | 12/2011 | Kim et al. |
| 2012/0182972 | A1 | 7/2012 | Guan et al. |
| 2014/0370902 | A1 | 12/2014 | Kim et al. |
| 2015/0109927 | A1 | 4/2015 | Ozturk et al. |
| 2015/0141015 | A1 | 5/2015 | Zhang et al. |
| 2015/0312811 | A1 | 10/2015 | Lei et al. |
| 2016/0157156 | A1 | 6/2016 | Chen et al. |
| 2016/0174111 | A1 | 6/2016 | Zhu et al. |
| 2017/0048763 | A1 | 2/2017 | Ke et al. |
| 2017/0048913 | A1 | 2/2017 | Teyeb et al. |
| 2017/0070923 | A1 | 3/2017 | Li et al. |
| 2017/0134996 | A1 | 5/2017 | Wang et al. |
| 2017/0171777 | A1* | 6/2017 | Laselva ................ H04W 24/10 |
| 2017/0289855 | A1 | 10/2017 | Xu et al. |
| 2017/0318458 | A1 | 11/2017 | Laselva et al. |
| 2018/0070276 | A1 | 3/2018 | Wu |
| 2018/0084464 | A1 | 3/2018 | Ozturk et al. |
| 2018/0132143 | A1* | 5/2018 | Sirotkin ................ H04W 88/06 |
| 2018/0192331 | A1 | 7/2018 | Masini et al. |

FOREIGN PATENT DOCUMENTS

| | | |
|---|---|---|
| EP | 2485529 A1 | 8/2012 |
| EP | 2485529 B1 | 11/2013 |
| EP | 2919520 | 9/2015 |
| ES | 2443872 | 2/2014 |
| GB | 2552507 | 7/2016 |
| GB | 201612923 | 9/2016 |
| WO | 2014182714 | 11/2014 |
| WO | 2015018006 | 2/2015 |
| WO | 2015057343 | 4/2015 |
| WO | 2017171900 | 10/2017 |
| WO | 2018038804 | 3/2018 |

OTHER PUBLICATIONS

European Patent Office Application Serial No. 17163824.0, Office Action dated Sep. 11, 2018, 5 pages.
Ericsson, "LWA bearer reconfiguration procedures", R2-156600, 3GPP TSG-RAN WG2 #92, Nov. 2015, 6 pages.
RAN3, et al., "Introduction of handover enhancement for Dual Connectivity" R2-157164_R3-152885, 3GPP TSG-RAN2 Meeting #92, Nov. 2015, 5 pages.
Samsung, "Mobility Enhancement for LWA", R3-160687, 3GPP TSG-RAN WG3 #91bis, Apr. 2016, 4 pages.
Catt, "Discussion on inter eNB handover without WT change" R3-161111, 3GPP TSG RAN WG3 Meeting #92, May 2016, 5 pages.
3rd Generation Partnership Project; Technical Specification Group Radio Access Network; Evolved Universal Terrestrial Radio Access Network (E-UTRAN) and Wireless LAN (WLAN); Xw application protocol (XwAP) (Release 13), 3GPP TS 36.463 v2.0.0, Mar. 2016, 93 pages.
RAN2, et al., "Reply LS for request for clarifications for WLAN deployments for LWA", S2-160040, SA WG2 Meeting #S2-113, Jan. 2016, 1 page.
United States Patent and Trademark Office U.S. Appl. No. 15/473,201, Notice of Allowance dated Jan. 22, 2019, 16 pages.
United States Patent and Trademark Office U.S. Appl. No. 15/473,201, Office Action dated Apr. 18, 2018, 20 pages.
Qualcomm, "LTE mobility without WT change", 3GPP TSG RAN WG2 Meeting #93bis, R2-162904, Apr. 2016, 3 pages.
Nokia, et al., "Inter-eNB HO without WT change", 3GPP TSG RAN WG2 Meeting #94, R2-163529, May 2016, 6 pages.
Intel, "Handover without WT change for LWA", 3GPP TSG RAN WG2 Meeting #94, R2-163571, May 2016, 5 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Section 22A.1 of 3GPP TS 36.300 V13.2.0, Dec. 2015, 11 pages.
The State Intellectual Property Office of the People's Republic of China Application Serial No. 201710217406.9, Office Action dated Nov. 15, 2019, 11 pages.
MediaTek Inc., "LTE/WLAN aggregation mobility aspects", R2-153814, 3GPP TSG-RAN2 #91 Meeting, Aug. 2015, 6 pages.
NEC, "LTE mobility in LWA", R2-156617, 3GPP TSG RAN WG2 Meeting #92, Nov. 2015, 3 pages.

* cited by examiner

METHOD AND APPARATUS FOR ENHANCING MOBILITY FOR 3GPP LTE-WLAN AGGREGATION IN WIRELESS COMMUNICATION SYSTEM

CROSS-REFERENCE TO RELATED APPLICATIONS

This application is a continuation of U.S. Pat Application No. 15/473,201, filed on March 29, 2017, now U.S. Pat. No. 10,313,933, which claims the benefit of U.S. Provisional Patent Application Nos. 62/317,416, filed on Apr. 1, 2016 and 62/363,856, filed on Jul. 19, 2016, the contents of which are all hereby incorporated by reference herein in their entirety.

BACKGROUND OF THE INVENTION

Field of the Invention

The present invention relates to wireless communications, and more particularly, to a method and apparatus for enhancing mobility for 3rd generation partnership project (3GPP) long-term evolution (LTE)-wireless local area network (WLAN) aggregation in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

With the ever increasing demand on mobile broadband services, the usage of unlicensed spectrum in general and wireless local area network (WLAN) in particular remains to be important for 3GPP operators. WLAN was initially deployed to provide opportunistic offload, however with increasing demand for throughput efficient usage of unlicensed spectrum, operator control and reduced WLAN deployment costs become more and more important.

In Rel-13, 3GPP defined LTE-WLAN aggregation (LWA) feature which addresses these requirements. Additionally, institute of electrical and electronics engineers (IEEE) 802.11 specifications continue to evolve. IEEE 802.11 are working on 802.11ax which aims at increasing spectral efficiency in 2.4 and 5 GHz bands, in particular in dense deployments with a theoretical peak throughput up to 9.6 Gbps and 1.6 Gbps under more realistic conditions. In the millimeter wave band of 60 GHz, 802.11ad is a ratified amendment to 802.11 that defines a new physical layer for 802.11 networks and can offer up to 7 Gbps throughputs. 802.11ay is in the process of enhancing 802.11ad and aims at improving mobility, range and providing data rates of at least 20 Gbps. Even though LWA framework has been designed largely agnostic to 802.11 technologies, such increased data rates may require additional optimizations.

The enhanced LWA (eLWA) builds on Rel-13 LWA framework without changes to the LWA architecture and thus supports WLAN nodes deployed and controlled by operators and their partners. One of the objectives of the eLWA is mobility optimization.

SUMMARY OF THE INVENTION

The present invention provides a method and apparatus for enhancing mobility for 3rd generation partnership project (3GPP) long-term evolution (LTE)-wireless local area network (WLAN) aggregation in a wireless communication system. The present invention provides eNodeB (eNB)-triggered handover procedure without WLAN termination (WT) change.

In an aspect, a method for performing inter-eNodeB (eNB) handover without wireless local area network (WLAN) termination (WT) change by a source eNB in a wireless communication system is provided. The method includes transmitting a handover request message including a WT identifier (ID) and WT XwAP ID to a target eNB, receiving a handover request acknowledge message indicating that a WT is kept from the target eNB, and transmitting a WT release request message indicating that the WT is kept to the WT. The WT is a logical node that terminates a Xw interface on a WLAN.

The WT ID may identify the WT.

The WT XwAP ID may be allocated by the WT and uniquely identify a user equipment (UE) over an Xw interface.

The handover request message may further include a mobility set of the WT.

The handover request message may further include information on E-UTRAN radio access bearers (E-RABs) for the WT.

The handover request acknowledge message may further include a long-term evolution (LTE)-wireless local area network (WLAN) aggregation (LWA) configuration.

The handover request acknowledge message may further include a revised mobility set for a UE based on selection of the target eNB.

The WT release request message may further include at least one of an eNB Xw AP ID, a WLAN Xw AP ID, or a cause to release.

In another aspect, a method for performing inter-eNodeB (eNB) handover without wireless local area network (WLAN) termination (WT) change by a target eNB in a wireless communication system is provided. The method includes receiving a handover request message including a WT identifier (ID) and WT XwAP ID from a source eNB, transmitting a WT addition request message including the WT XwAP ID to a WT, receiving a WT addition request acknowledge message from the WT, and transmitting a handover request acknowledge message indicating that the WT is kept to the source eNB. The WT is a logical node that terminates an Xw interface on a WLAN.

The WT ID may identify the WT.

The WT XwAP ID may be allocated by the WT and uniquely identify a user equipment (UE) over an Xw interface.

The handover request message may further include a mobility set of the WT.

The WT addition request message may further include at least one of an eNB Xw AP ID, an E-UTRAN radio access bearer (E-RAB) ID, an E-RAB quality of service (QoS), an eNB GPRS tunneling protocol (GTP) tunnel endpoint, a data forwarding indication, a security key, a selected wireless local area network (WLAN) identifier or revised mobility set, or a WLAN media access control (MAC) address.

The handover request acknowledge message may further include a long-term evolution (LTE)-wireless local area network (WLAN) aggregation (LWA) configuration.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
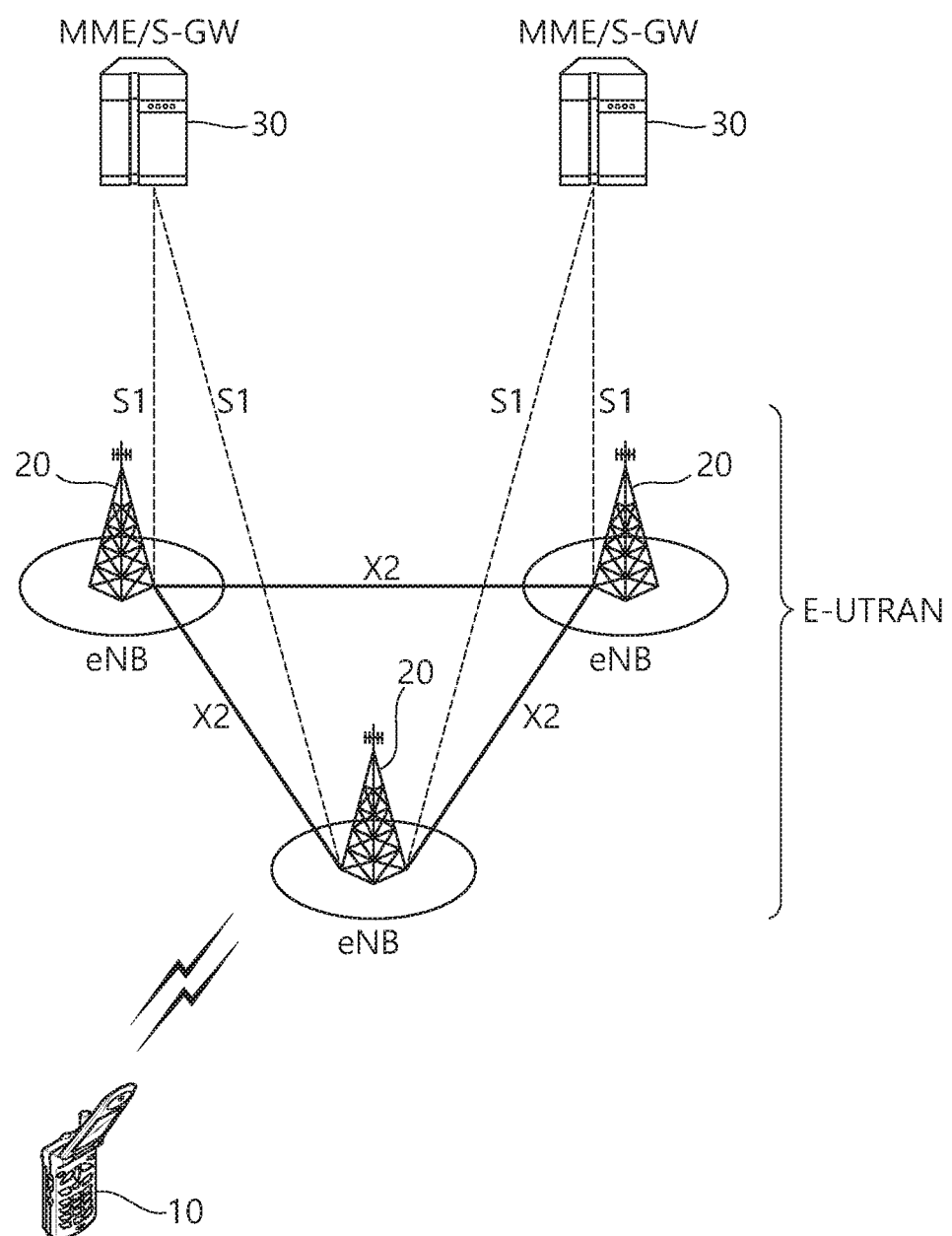
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

LTE-wireless local area network (WLAN) aggregation (LWA) is described. It may be referred to Section 22A.1 of 3GPP TS 36.300 V13.2.0 (2015-12). E-UTRAN supports LWA operation whereby a UE in RRC_CONNECTED is configured by the eNB to utilize radio resources of LTE and WLAN. Two scenarios are supported depending on the backhaul connection between LTE and WLAN, one of which is non-collocated LWA scenario for a non-ideal backhaul and the other is collocated LWA scenario for an ideal/internal backhaul.

Figure 2:
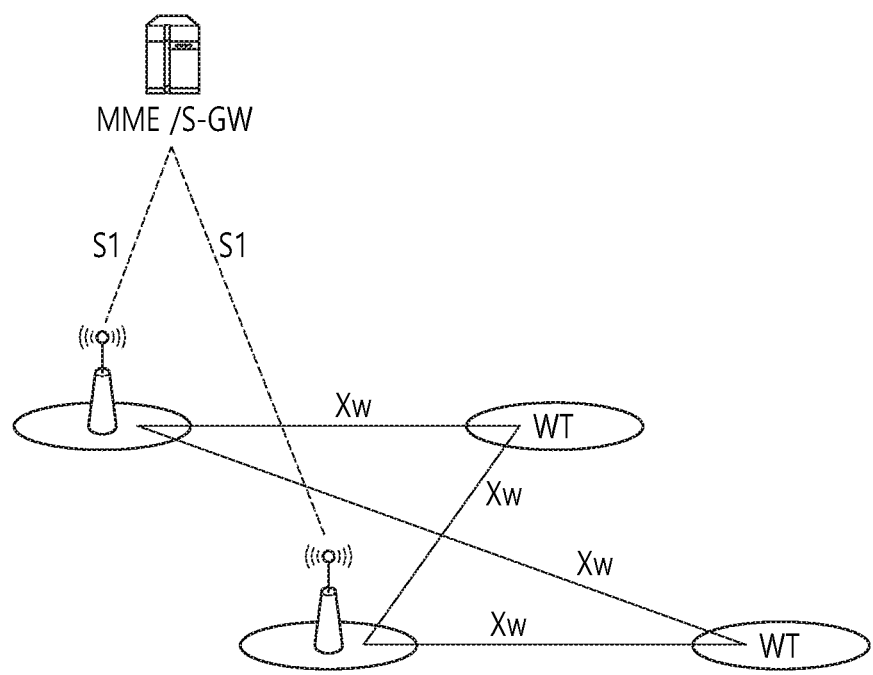
FIG. 2 shows an overall architecture for the non-collocated LWA scenario.

FIG. 2 shows an overall architecture for the non-collocated LWA scenario. Referring to FIG. 2, Referring to FIG. 7, in the non-collocated LWA scenario, the eNB is connected to one or more WLAN terminations (WTs) via an Xw interface. The WT terminates the Xw interface, between the eNB and WT, for WLAN. The WT is a logical node that terminates the Xw interface on the WLAN side, and 3GPP may not specify where it is implemented. In the collocated LWA scenario, the interface between LTE and WLAN is up to implementation.

In LWA, the radio protocol architecture that a particular bearer uses depends on the LWA backhaul scenario and how the bearer is set up. Two bearer types exist for LWA: split LWA bearer and switched LWA bearer.

For protocol data units (PDUs) sent over WLAN in LWA operation, the LWA adaptation protocol (LWAAP) entity generates LWA PDU containing a data RB (DRB) identity and the WT uses the LWA EtherType for forwarding the data to the UE over WLAN. The UE uses the LWA EtherType to determine that the received PDU belongs to an LWA bearer and uses the DRB identity to determine to which LWA bearer the PDU belongs to. In the DL, LWA supports split bearer operation where the packet data convergence protocol (PDCP) sublayer of the UE supports in-sequence delivery of upper layer PDUs based on the reordering procedure introduced for dual connectivity (DC). In the UL, PDCP PDUs can only be sent via the LTE.

The UE supporting LWA may be configured by the eNB to send PDCP status report or LWA PDCP status report, in cases where feedback from WT is not available.

For LWA, the only required interfaces to the Core Network are S1-U and S1-MME which are terminated at the eNB. No Core Network interface is required for the WLAN.

For user plane, in the non-collocated LWA scenario, the Xw user plane interface (Xw-U) is defined between eNB and WT. The S1-U is terminated at the eNB; the eNB and the WT are interconnected via Xw-U. The Xw-U interface supports flow control based on feedback from WT. The flow control function is applied in the DL when an E-UTRAN radio access bearer (E-RAB) is mapped onto an LWA bearer, i.e. the flow control information is provided by the WT to the eNB for the eNB to control the DL user data flow to the WT for the LWA bearer. The Xw-U interface is used to deliver LWA PDUs between eNB and WT. For LWA, the S1-U terminates in the eNB and, if Xw-U user data bearers are associated with E-RABs for which the LWA bearer option is configured, the user plane data is transferred from eNB to WT using the Xw-U interface.

For control plane, in the non-collocated LWA scenario, the Xw control plane interface (Xw-C) is defined between eNB and WT. The S1-MME is terminated in eNB; the eNB and the WT are interconnected via Xw-C. The application layer signaling protocol is referred to as Xw-AP (Xw application protocol). The Xw-AP protocol supports the following functions:

Transfer of WLAN metrics (e.g. basic service set (BSS) load) from WT to eNB;

Support of LWA for UE in evolved packet system (EPS) connection management (ECM) connected state (ECM-CONNECTED): Establishment, modification and release of a UE context at the WT, control of user plane tunnels between eNB and WT for a specific UE for LWA bearers.

General Xw management and error handling functions: Error indication, setting up the Xw, resetting the Xw, updating the WT configuration data.

eNB-WT control plane signaling for LWA is performed by means of Xw-C interface signaling. There is only one S1-MME connection per LWA UE between the eNB and the MME. Respective coordination between eNB and WT is performed by means of Xw interface signaling.

A WLAN mobility set is a set of one or more WLAN access points (APs) identified by one or more BSS identifier (BSSID)/home equivalent SSID (HESSID)/SSIDs, within which WLAN mobility mechanisms apply while the UE is configured with LWA bearer(s), i.e., the UE may perform mobility between WLAN APs belonging to the mobility set without informing the eNB.

The eNB provides the UE with a WLAN mobility set. When the UE is configured with a WLAN mobility set, it will attempt to connect to a WLAN whose identifiers match the ones of the configured mobility set. UE mobility to WLAN APs not belonging to the UE mobility set is controlled by the eNB, e.g. updating the WLAN mobility set based on measurement reports provided by the UE. A UE is connected to at most one mobility set at a time.

All APs belonging to a mobility set share a common WT which terminates Xw-C and Xw-U. The termination endpoints for Xw-C and Xw-U may differ. The WLAN identifiers belonging to a mobility set may be a subset of all WLAN identifiers associated to the WT.

The WT Addition procedure is initiated by the eNB and is used to establish a UE context at the WT in order to provide WLAN resources to the UE. The eNB decides to request the WT to allocate WLAN resources for specific E-RABs, indicating E-RAB characteristics, by transmitting the WT Addition Request message. The WT may reject the request. If the WT is able to admit the full or partial WLAN resource request, it responds with the WT Request Acknowledge message. The eNB sends the RRCConnectionReconfiguration message to the UE including the new radio resource configuration. The UE applies the new configuration and replies with the RRCConnectionReconfigurationComplete message. The UE performs WLAN association. The WT sends the WT Association Confirmation message. If configured by the eNB, the UE may send the WLANConnectionStatusReport message.

The WT Release procedure may be initiated either by the eNB or by the WT and is used to initiate the release of the UE context at the WT. The recipient node of this request cannot reject. It does not necessarily need to involve signaling towards the UE. In eNB initiated WT Release, the eNB requests the WT to release the allocated WLAN resources by transmitting the WT Release Request message. The WT initiates release of all allocated WLAN resources. If required, the eNB sends the RRCConnectionReconfiguration message to the UE indicating the release of WLAN radio resource configuration. The UE replies with the RRCConnectionReconfigurationComplete message. The UE releases the LWA configuration towards the assigned WLAN resources. It is up to UE implementation what happens with WLAN association after LWA configuration has been released.

Hereinafter, various enhanced mobility procedures for LWA are proposed according to embodiments of the present invention. According to the embodiments of the present invention, the enhanced mobility procedures for intra- and/or inter-eNB handover with/without WT change and improvement of WT change are proposed.

1. First Embodiment: eNB Triggered Handover Procedure without WT Change

For this embodiment of the present invention, a use case that one WT has coverage overlapping with two macro eNBs may exist. Thus, it is possible that the same WT is kept for a specific UE during the handover. Inter-eNB handover without WT change is used to transfer context data from a source eNB to a target eNB while the LWA connectivity is kept.

Figure 3:
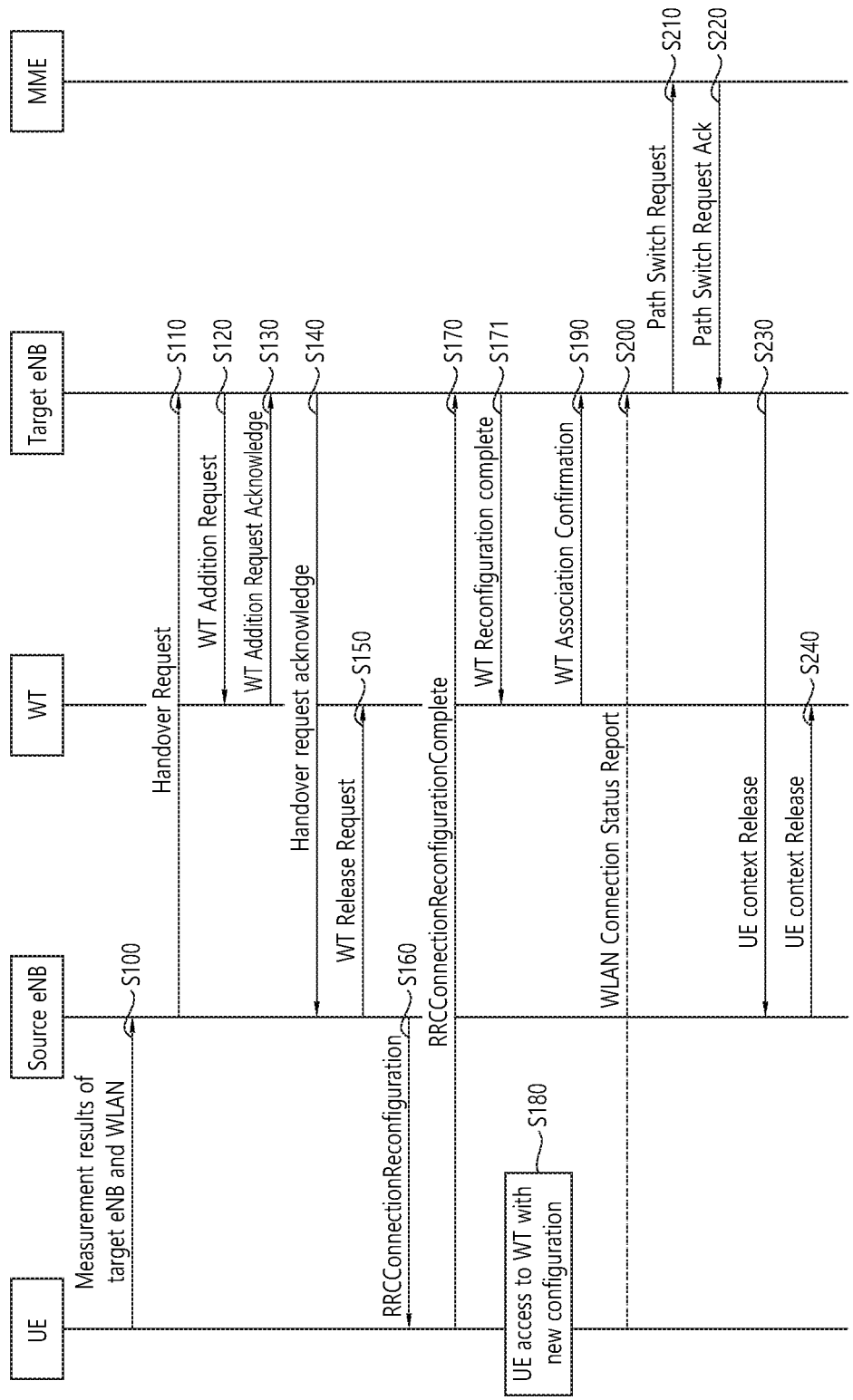
FIG. 3 shows a method for performing inter-eNB handover without WT change according to an embodiment of the present invention.

FIG. 3 shows a method for performing inter-eNB handover without WT change according to an embodiment of the present invention.

In step S100, upon performing measurement of target eNB and/or WLAN, the UE may transmit measurement results of target eNB and/or WLAN to the source eNB.

In step S110, the source eNB starts the handover procedure by initiating the X2 handover preparation procedure. That is, the source eNB transmits the Handover Request message to the target eNB. The source eNB may include at least one of the followings in the Handover Request message.

a) Indication of keeping the WT: For example, it may be WT ID. WT ID is may be used to identify the WT.

b) Selected WLAN identifier (e.g. SSID, BSSID, HESSID) or mobility set c) Old WT XwAP ID: It may be WT UE XwAP ID which is allocated by the WT and uniquely identifies the UE over the Xw interface. It may let the target eNB and WT identify the UE.

d) Information on E-RABs for WLAN: E-RAB ID, quality of service (QoS), etc.

That is, the source eNB may include the LWA configuration in the HANDOVER REQUEST, and the LWA configuration may include the mobility set currently valid for the UE, the WT UE XwAP ID and WT ID as a reference to the UE context in the WT that was established by the source eNB.

Table 1 shows an example of the Handover Request message according to an embodiment of the present invention.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0 \ldots 2^{32} - 1)$ | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 ... <maxnoofBearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |

TABLE 1-continued

| IE/Group Name | Presence | Range | IE type and reference | Semantics description | Criticality | Assigned Criticality |
|---|---|---|---|---|---|---|
| >>>Bearer Type | O | | 9.2.92 | | YES | reject |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | 9.2.69 | | YES | ignore |
| UE History Information from the UE | O | | OCTET STRING | VisitedCellInfo List contained in the UEInformation Response message (TS 36.331 [9]) | YES | ignore |
| Expected UE Behaviour | O | | 9.2.70 | | YES | ignore |
| ProSe Authorized | O | | 9.2.78 | | YES | ignore |
| UE Context Reference at the SeNB | O | | | | YES | ignore |
| >Global SeNB ID | M | | Global eNB ID 9.2.22 | | | |
| >SeNB UE X2AP ID | M | | eNB UE X2AP ID 9.2.24 | Allocated at the SeNB | | |
| >SeNB UE X2AP ID Extension | O | | Extended eNB UE X2AP ID 9.2.86 | Allocated at the SeNB | | |

TABLE 1-continued

| IE/Group Name | Presence | Range | IE type and reference | Semantics description | Criticality | Assigned Criticality |
|---|---|---|---|---|---|---|
| Old eNB UE X2AP ID Extension | O | | Extended eNB UE X2AP ID 9.2.86 | Allocated at the source eNB | YES | reject |
| V2X Services Authorized | O | | 9.2.93 | | YES | ignore |
| UE Context Reference at the WT | O | | | | YES | ignore |
| >WT ID | M | | 9.2.x | | | |
| >WT UE XwAP ID | M | | 9.2.y | | | |

Referring to Table 1, the Handover Request message may include the "UE Context Reference at the WT" information element (IE) according to an embodiment of the present invention. The "UE Context Reference at the WT" IE may include the "WT ID" IE and/or "WT UE XwAP ID" IE, according to an embodiment of the present invention.

The "WT ID" IE corresponds to a) the indication of keeping the WT, i.e. WT ID, in step S110. Table 2 shows an example of the "WT ID" IE according to an embodiment of the present invention.

TABLE 2

| IE/Group Name | Presence | Range | IE type and reference | Semantics description |
|---|---|---|---|---|
| CHOICE WT ID Type | M | | | |
| >WT ID Type 1 | | | | |
| >>PLMN ID | M | | PLMN Identity 9.2.4 | |
| >>Short WT ID | M | | BIT STRING (24) | |
| >WT ID Type 2 | | | | |
| >>Long WT ID | M | | BIT STRING (48) | |

The "WT UE XwAP ID" IE corresponds to c) the old WT XwAP ID, in step S110. Table 3 shows an example of the "WT UE XwAP ID" IE according to an embodiment of the present invention.

TABLE 3

| IE/Group Name | Presence | Range | IE type and reference | Semantics description |
|---|---|---|---|---|
| WT UE XwAP ID | M | | OCTET STRING (SIZE(3)) | |

If the target eNB decides to keep the WT, in step S120, the target eNB transmits the WT Addition Request message to the WT. The WT Addition Request message may include at least one of the followings:

a) eNB Xw AP ID to identify the UE
b) E-RAB ID, E-RAB QoS, eNB GPRS tunneling protocol (GTP) tunnel endpoint (for UL PDU delivery)
c) Data forwarding indication
d) Security key
e) Selected WLAN identifier (e.g. SSID, BSSID, HESSID) or revised mobility set
f) Old WT XwAP ID to let the WT identify the UE
g) WLAN media access control (MAC) address That Is, if the target eNB decides to keep the LWA connection, the target eNB transmits the WT Addition Request message to the WT including the WT UE XwAP ID as a reference to the UE context in the WT that was established by the source eNB. All or a part of the information described above may be received from the source eNB in step S110.

Table 4 shows an example of the WT Addition Request message according to an embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | reject |
| UE Identity | M | | 9.2.16 | | YES | reject |
| WLAN Security Information | O | | 9.2.27 | | YES | reject |
| Serving PLMN | O | | PLMN Identity 9.2.3 | The serving PLMN for the UE. | YES | ignore |

TABLE 4-continued

| IE/Group Name | Presence | Range | IE type and reference | Semantics description | Criticality | Assigned Criticality |
|---|---|---|---|---|---|---|
| E-RABs To Be Added List | | 1 | | | YES | reject |
| >E-RABs To Be Added Item | | 1 ... <maxnoofBearers> | | | EACH | reject |
| >>E-RAB ID | M | | 9.2.18 | | — | — |
| >>E-RAB Level QoS Parameters | M | | 9.2.19 | Includes necessary QoS parameters | — | — |
| >> eNB GTP Tunnel Endpoint | M | | GTP Tunnel Endpoint 9.2.22 | Endpoint of the Xw transport bearer at the eNB | — | — |
| Mobility Set | M | | 9.2.28 | | YES | reject |
| WT UE XwAP ID | O | | UE XwAP ID 9.2.24 | Previously assigned by the WT | YES | reject |

Referring to Table 4, the WT Addition Request message may include the "WT UE XwAP ID" IE according to an embodiment of the present invention. The "WT UE XwAP ID" IE corresponds to f) the old WT XwAP ID, in step S120. The "WT UE XwAP ID" IE uniquely identifies a UE over the Xw interface within a WT or an eNB.

The WT shall use the information in the WT Addition Request message to check if the UE context is present. If successful, in step S130, the WT replies with the WT Addition Request Acknowledge message to the target eNB. The WT Addition Request Acknowledge message may include at least one of the followings:

a) eNB Xw AP ID, WLAN Xw AP ID to identify the UE b) Admitted E-RAB IDs, WLAN GTP tunnel endpoint (for DL PDU delivery)

c) Not admitted E-RAB IDs d) Data forwarding tunnel endpoint IDs (TEIDs)

e) Indication of whether WLAN is kept or not

If the target eNB and the WT have decided to keep the UE context in the WT in step S120 and S130, in step S140, the target eNB transmits the Handover Request Acknowledge message to the source eNB by including at least one of the followings.

a) Indication of whether WLAN is kept or not b) Revised mobility set for UE based on target eNB's selection c) LWA configuration in RRC container to configure UE: LWA bearer added or removed That is, if both the target eNB and the WT decided to keep the LWA connection in steps S120 and S130 respectively, the target eNB transmits the Handover Request Acknowledge message, which includes the LWA configuration and the UE LWA context kept indicator. The Handover Request Acknowledge message may also provide forwarding addresses to the source eNB.

Table 5 shows an example of the Handover Request Acknowledge message according to an embodiment of the present invention.

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| > E-RABs Admitted Item | | 1 ... <maxnoofBearers> | | | EACH | ignore |

TABLE 5-continued

| IE/Group Name | Presence | Range | IE type and reference | Semantics description | Criticality | Assigned Criticality |
|---|---|---|---|---|---|---|
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |
| >>DL GTP Tunnel Endpoint | O | | GTP Tunnel Endpoint 9.2.1 | Identifies the X2 transport bearer. used for forwarding of DL PDUs | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | O | | 9.2.7 | | YES | ignore |
| UE Context Kept Indicator | O | | 9.2.85 | | YES | ignore |
| Old eNB UE X2AP ID Extension | O | | Extended eNB UE X2AP ID 9.2.86 | Allocated at the source eNB | YES | ignore |
| New eNB UE X2AP ID Extension | O | | Extended eNB UE X2AP ID 9.2.86 | Allocated at the target eNB | YES | reject |
| WT UE Context Kept Indicator | O | | UE Context Kept Indicator 9.2.85 | Indicates that the WT has acknowledged to keep the UE context | YES | ignore |

Referring to Table 5, the Handover Request Acknowledge message may include the "WT UE Context Kept Indicator" IE according to an embodiment of the present invention. The "WT UE Context Kept Indicator" IE corresponds to a) the indication of whether WLAN is kept or not, in step S140.

In step S150, the source eNB transmits the WT Release Request message to the WT. The source eNB indicates to the WT that the UE context in the WT is kept. If the indication as the UE context kept in WT is included, the WT keeps the UE context. The WT Release Request message may include at least one of the followings.

a) eNB Xw AP ID, WLAN Xw AP ID to identify the UE
b) Cause to release
c) Indication of whether WLAN is kept or not That is, the source eNB transmits the WT Release Request message to the WT, indicating whether the UE context has been matched at the target eNB. The WT keeps the relevant part of the UE context based on the identification information provided from the target eNB at step S120.

Table 6 shows an example of the WT Release Request message according to an embodiment of the present invention.

TABLE 6

| IE/Group Name | Presence | Range | IE type and reference | Semantics description | Criticality | Assigned Criticality |
|---|---|---|---|---|---|---|
| Message Type | M | | 9.2.1 | | YES | ignore |
| eNB UE XwAP ID | M | | UE XwAP ID 9.2.24 | Assigned by the eNB | YES | reject |
| WT UE XwAP ID | M | | UE XwAP ID 9.2.24 | Assigned by the WT | YES | reject |
| Cause | O | | 9.2.4 | | YES | ignore |
| E-RABs To Be Released List | | 0 . . . 1 | | | YES | ignore |
| >E-RABs To Be Released Item | | 1 . . . <maxnoofBearers> | | | EACH | ignore |
| >>E-RAB ID | M | | 9.2.18 | | — | — |
| >>DL Forwarding GTP Tunnel Endpoint | O | | GTP Tunnel Endpoint 9.2.22 | Identifies the Xw transport bearer. used for forwarding of DL PDUs | — | — |
| UE Context Kept Indicator | O | | 9.2.x | | YES | ignore |

Referring to Table 6, the WT Release Request message may include the "UE Context Kept Indicator" IE according to an embodiment of the present invention. The "UE Context Kept Indicator" IE corresponds to c) the indication of whether WLAN is kept or not, in step S150. Table 7 shows an example of the "UE Context Kept Indicator" IE according to an embodiment of the present invention. This IE indicates that the UE context at the WT is kept in case of inter-eNB handover without WT change procedure.

TABLE 7

| IE/Group Name | Presence | Range | IE type and reference | Semantics description |
|---|---|---|---|---|
| UE Context Kept Indicator | M | | ENUMERATED (True, . . .) | |

Upon reception of the WT Release Request message containing the "UE Context Kept Indicator" IE set to "True", the WT shall, if supported, only initiate the release of the resources related to the UE-associated signaling connection between the eNB and the WT. Further, the source eNB may postpone sending the WT Release Request message until the UE Context Release message, which will be described below, is received.

In step S160, the source eNB triggers the UE to apply the new configuration.

In step S170, the UE synchronizes to the target eNB and replies with the RRCConnectionReconfigurationComplete message, which is also sent to the WT to notify configuration complete in step S171. The order of steps S150 and S160/S170/S171 can be adjusted.

In step S180, the UE accesses to the WT.

In step S190, the WT transmits the WT Association Confirmation message to the target eNB if the UE accesses the WLAN successfully, which notifies it to the WT. The WT Association Confirmation message may include eNB Xw AP ID, WLAN Xw AP ID to identify the UE.

In step S200, the UE may also notifies the target eNB of the status of access to the WLAN by transmitting the WLAN Connection Status Report message.

In step S210/S220, the target eNB initiates the S1 path switch procedure towards the MME.

In step S230, the target eNB initiates the UE Context Release procedure towards the source eNB.

In step S240, upon reception of the UE Context Release message, the WT can release C-plane related resource associated to the UE context towards the source eNB. Any ongoing data forwarding may continue. The WT shall not release the UE context associated with the target eNB if the indication was included in the WT Release Request message in step S150.

Sometime after the handover without WT change procedure, the target eNB may provide the UE and the WT with new WLAN security information. Based on this information, the UE re-authenticates itself in the WLAN.

Before the source eNB initiates the WT Release Request procedure, the WT is configured with bearer tunnels to both the source and target eNB. According to the inter-eNB handover procedure without WT change according to an embodiment of the present invention, in the DL, the source eNB forwards end marker packets immediately after the last data packets sent to the WT for a particular bearer, and the WT forwards packets received from either eNB towards the UE. The end marker packets may be used by the UE to switch the PDCP key. In the UL, the UE inserts end marker packets to indicate the key switch. The source eNB may use the end marker packets to infer which packets it should process or discard while the source Xw-u tunnel is operational. The target eNB processes all received packets.

Figure 4:
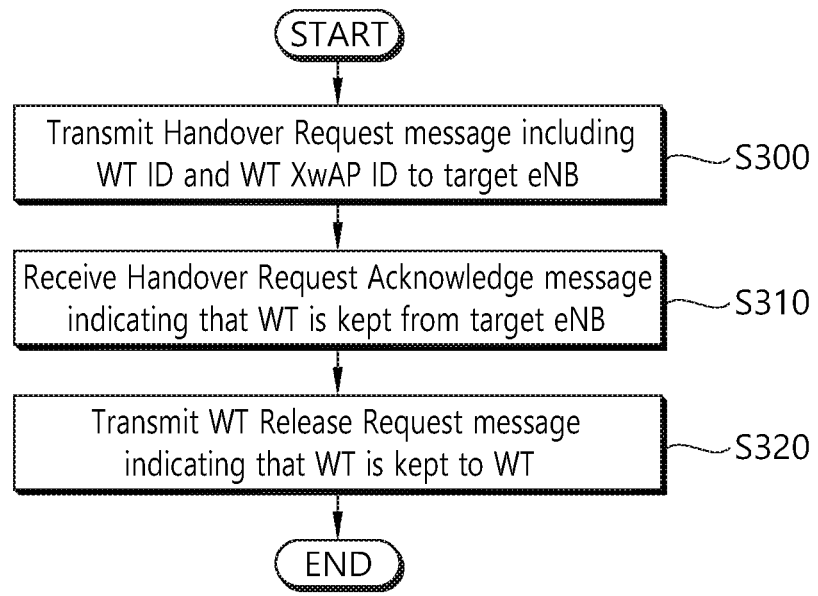
FIG. 4 shows a method for performing inter-eNB handover without WT change by a source eNB according to an embodiment of the present invention.

FIG. 4 shows a method for performing inter-eNB handover without WT change by a source eNB according to an embodiment of the present invention.

In step S300, the source eNB transmits a handover request message including a WT ID and WT XwAP ID to a target eNB. The WT ID may identify the WT. The WT XwAP ID may be allocated by the WT and may uniquely identify a UE over an Xw interface. The handover request message may further include a mobility set of the WT. The handover request message further includes information on E-RABs for the WT.

In step S310, the source eNB receives a handover request acknowledge message indicating that a WT is kept from the target eNB. The handover request acknowledge message may further include a LWA configuration. The handover request acknowledge message may further include a revised mobility set for a UE based on selection of the target eNB.

In step S320, the source eNB transmits a WT release request message indicating that the WT is kept to the WT. The WT release request message may further include at least one of an eNB Xw AP ID, a WLAN Xw AP ID, or a cause to release.

Figure 5:
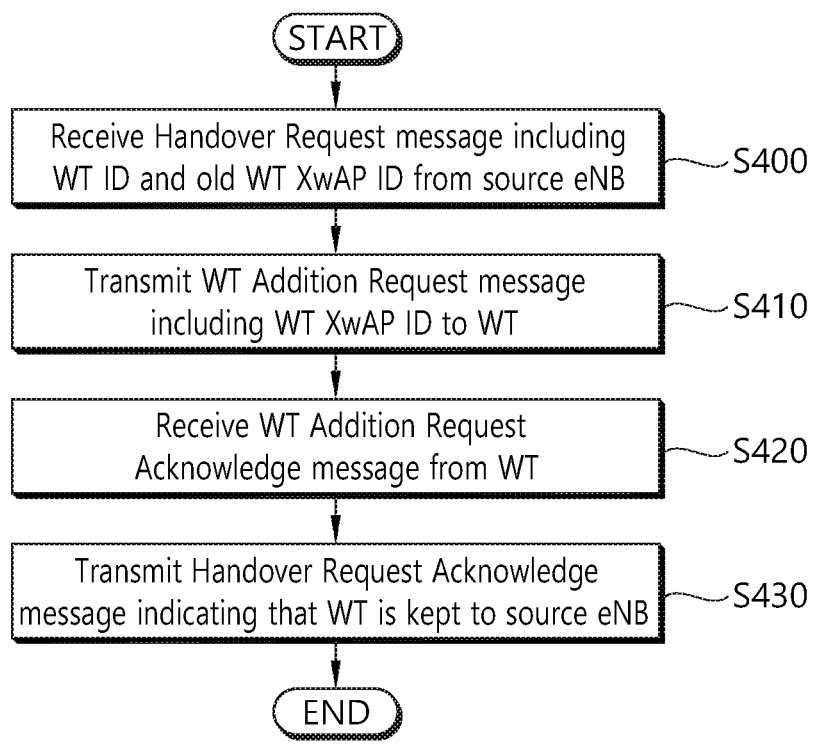
FIG. 5 shows a method for performing inter-eNB handover without WT change by a target eNB according to an embodiment of the present invention.

FIG. 5 shows a method for performing inter-eNB handover without WT change by a target eNB according to an embodiment of the present invention.

In step S400, the target eNB receives a handover request message including a WT ID and WT XwAP ID from a source eNB. The WT ID may identify the WT. The WT XwAP ID may be allocated by the WT and may uniquely identify a UE over an Xw interface. The handover request message may further include a mobility set of the WT.

In step S410, the target eNB transmits a WT addition request message including the WT XwAP ID to a WT. The WT addition request message may further include at least one of an eNB Xw AP ID, an E-RAB ID, an E-RAB QoS, an eNB GTP tunnel endpoint, a data forwarding indication, a security key, a selected WLAN identifier or revised mobility set, or a WLAN MAC address.

In step S420, the target eNB receives ng a WT addition request acknowledge message from the WT.

In step S430, the target eNB transmits a handover request acknowledge message indicating that the WT is kept to the source eNB. The handover request acknowledge message may further include a LWA configuration.

2. Second Embodiment: eNB Triggered WT Change Procedure

In the coverage area of the eNB, there may be several WTs. Accordingly, the change of WT for a specific UE may occur.

Figure 6:
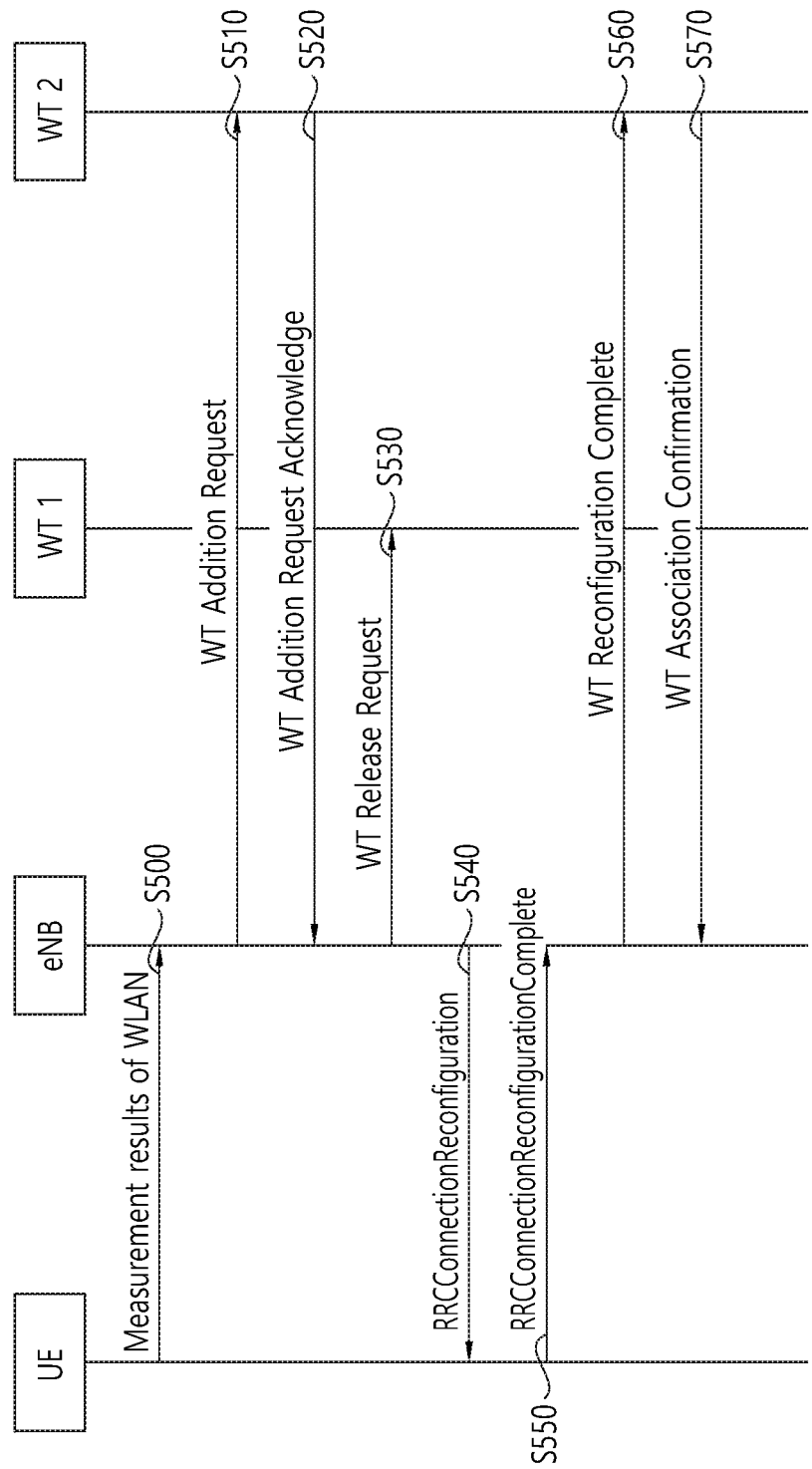
FIG. 6 shows a method for performing an eNB triggered WT change according to an embodiment of the present invention.

FIG. 6 shows a method for performing an eNB triggered WT change according to an embodiment of the present invention.

In step S500, upon performing measurement of WLAN, the UE may transmit measurement results of or WLAN to the eNB.

In step S510, the eNB transmits the WT Addition Request message to the WT2. The WT Addition Request message may include at least one of the followings:
a) eNB Xw AP ID to identify the UE
b) E-RAB ID, E-RAB QoS, eNB GTP tunnel endpoint (for UL PDU delivery)
c) Data forwarding indication
d) Security key
e) selected WLAN identifier (e.g. SSID, BSSID, HESSID)

In step S520, the WT2 transmits the WT Addition Request Acknowledge message to the eNB. The WT Addition Request Acknowledge message may include at least one of the followings:
a) eNB Xw AP ID, WLAN Xw AP ID to identify the UE
b) Admitted E-RAB IDs, WLAN GTP tunnel endpoint (for DL PDU delivery)
c) Not admitted E-RAB IDs
d) Data forwarding TEIDs In step S530, the eNB transmits the WT Release Request message to the WT1. The WT Release Request message may include at least one of the followings.
a) eNB Xw AP ID, WLAN Xw AP ID to identify the UE
b) E-RAB to be released: E-RAB ID, DL/UL forwarding GP tunnel endpoint
c) Cause to release In step S540, the eNB triggers the UE to apply the new configuration. In step S550, the UE transmits the RRCConnectionReconfigurationComplete message to the eNB.

In step S560, the eNB transmits the WT Reconfiguration Complete message to the WT2. The WT Reconfiguration Complete message may include eNB Xw AP ID, WLAN Xw AP ID to identify the UE.

In step S570, the WT2 transmits the WT Association Confirmation message to the eNB. The WT Association Confirmation message may include eNB Xw AP ID, WLAN Xw AP ID to identify the UE.

3. Third Embodiment: eNB Triggered Handover Procedure with WT Release Procedure Together For this embodiment of the present invention, a use case that one WT has coverage overlapping with two Macro eNBs may exist. Thus, it is possible that the original WT is released for a specific UE during the handover.

Figure 7:
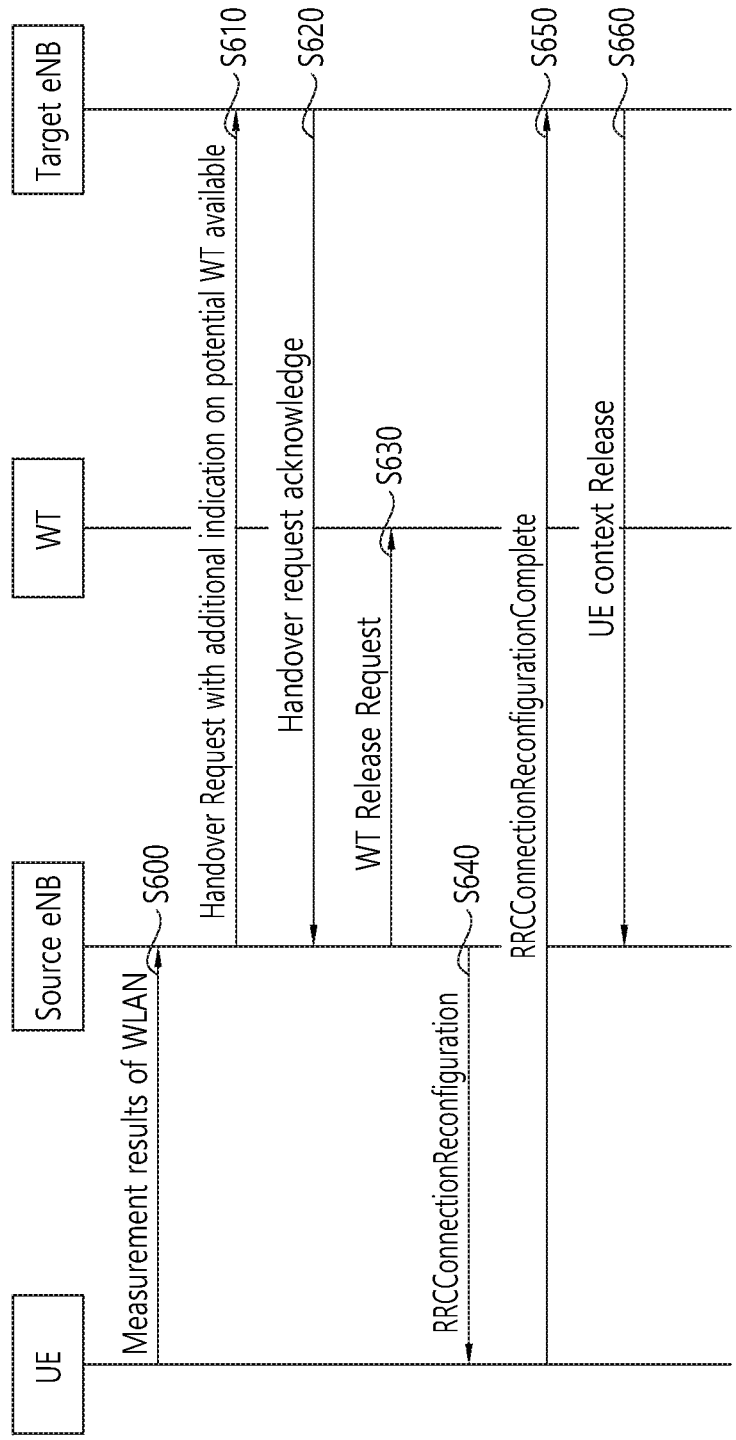
FIG. 7 shows a method for performing an eNB triggered handover procedure with WT release procedure according to an embodiment of the present invention.

FIG. 7 shows a method for performing an eNB triggered handover procedure with WT release procedure according to an embodiment of the present invention.

In step S600, upon performing measurement of WLAN, the UE may transmit measurement results of or WLAN to the source eNB.

In step S610, the source eNB transmits the Handover Request message with additional indication on potential WT available to the target eNB. The Handover Request message may further includes a selected WLAN identifier (e.g. SSID, BSSID, HESSID).

In step S620, the target eNB transmits the Handover Request Acknowledge message to the source eNB.

In step S630, the source eNB transmits the WT Release Request message to the WT. The WT Release Request message may include at least one of the followings.
  a) eNB Xw AP ID, WLAN Xw AP ID to identify the UE
  b) E-RAB to be released: E-RAB ID, DL/UL forwarding GP tunnel endpoint
  c) Cause to release In step S640, the source eNB triggers the UE to apply the new configuration.

In step S650, the UE synchronizes to the target eNB and replies with the RRCConnectionReconfigurationComplete message.

In step S660, the target eNB initiates the UE Context Release procedure towards the source eNB.

4. Fourth Embodiment: eNB Triggered Handover Procedure with Direct WT Addition Procedure Together For this embodiment of the present invention, a use case that one WT has coverage overlapping with two Macro eNBs may exist. Thus, it is possible that the target eNB may trigger the WT addition directly for a specific UE during the handover.

Figure 8:
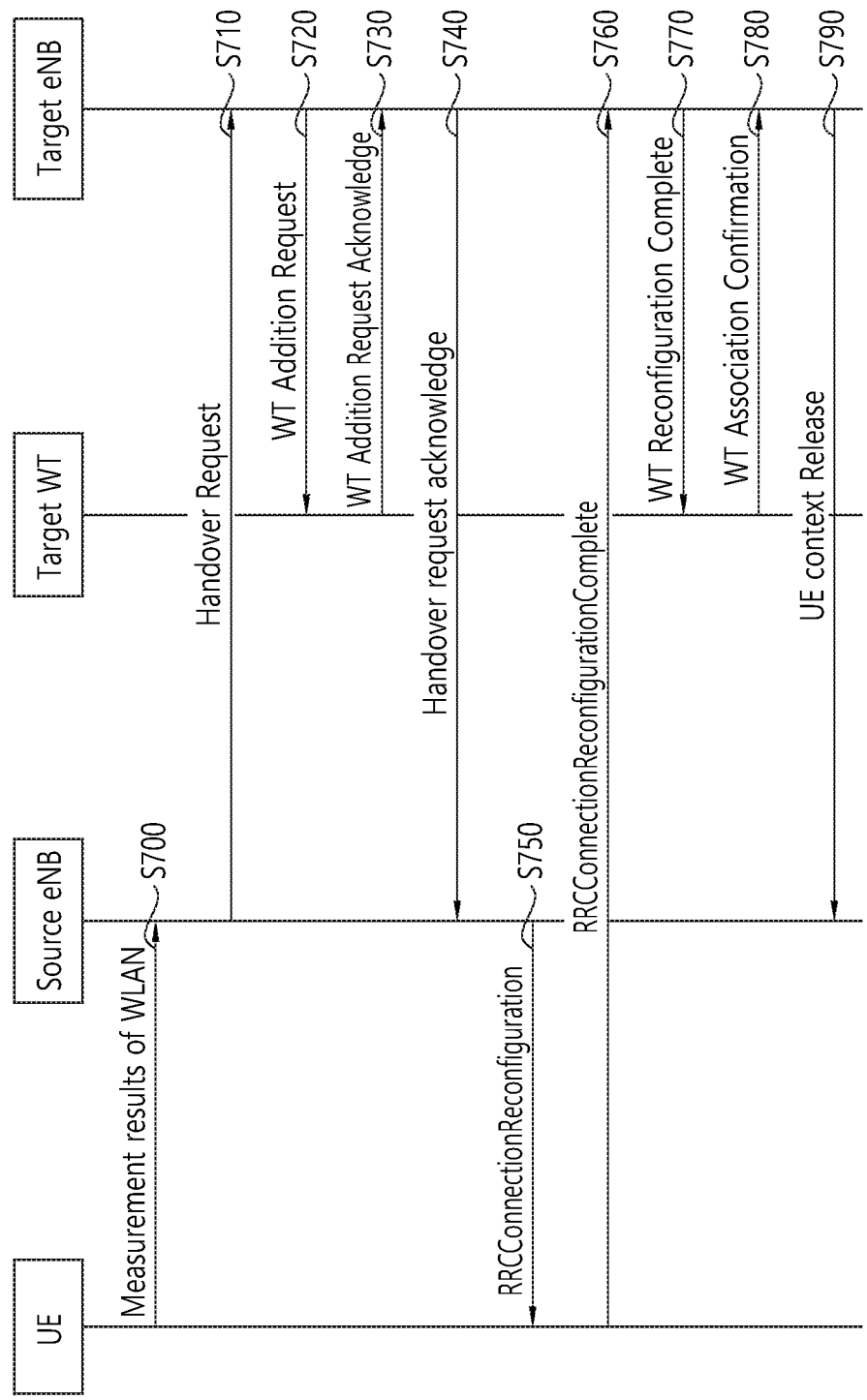
FIG. 8 shows a method for performing an eNB triggered handover procedure with direct WT addition procedure according to an embodiment of the present invention.

FIG. 8 shows a method for performing an eNB triggered handover procedure with direct WT addition procedure according to an embodiment of the present invention.

In step S700, upon performing measurement of WLAN, the UE may transmit measurement results of or WLAN to the source eNB.

In step S710, the source eNB transmits the Handover Request message, with WLAN measurement results to assist the target eNB for a decision, to the target eNB.

In step S720, the target eNB transmits the WT Addition Request message to the target WT. The WT Addition Request message may include at least one of the followings:
  a) eNB Xw AP ID to identify the UE
  b) E-RAB ID, E-RAB QoS, eNB GTP tunnel endpoint (for UL PDU delivery)
  c) Data forwarding indication
  d) Security key
  e) selected WLAN identifier (e.g. SSID, BSSID, HESSID)

In step S730, the target WT transmits the WT Addition Request Acknowledge message to the target eNB. The WT Addition Request Acknowledge message may include at least one of the followings:
  a) eNB Xw AP ID, WLAN Xw AP ID to identify the UE
  b) Admitted E-RAB IDs, WLAN GTP tunnel endpoint (for DL PDU delivery)
  c) Not admitted E-RAB IDs
  d) Data forwarding TEIDs In step S740, the target eNB transmits the Handover Request Acknowledge message to the source eNB.

In step S750, the source eNB triggers the UE to apply the new configuration.

In step S760, the UE synchronizes to the target eNB and replies with the RRCConnectionReconfigurationComplete message, which is also sent to the target WT to notify configuration complete in step S770.

In step S780, the target WT transmits the WT Association Confirmation message to the target eNB. The WT Association Confirmation message may include eNB Xw AP ID, WLAN Xw AP ID to identify the UE.

In step S790, the target eNB initiates the UE Context Release procedure towards the source eNB.

Figure 9:
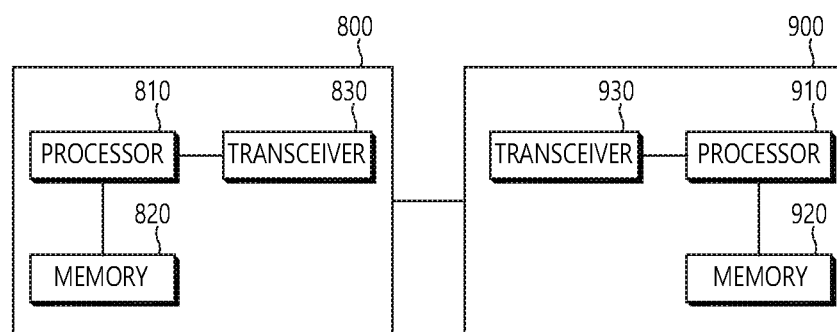
FIG. 9 shows a communication system to implement an embodiment of the present invention.

FIG. 9 shows a communication system to implement an embodiment of the present invention.

A source eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A target eNB 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, mobility for LWA can be enhanced.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a source base station in a wireless communication system, the method comprising:
    establishing an Xw interface with a wireless local area network (WLAN) termination (WT),
    wherein the WT is a logical node that terminates the Xw interface, and
    wherein the Xw interface is also established between a target base station and the WT; and
    performing an inter-base station handover without WT change in which a wireless device currently connected to both the source base station and the WT is to be handed over from the source base station to the target base station while keeping connection with the WT, the inter- base station handover comprising:
        transmitting, to the target base station, a handover request message including a WT identifier (ID) and WT XwAP ID;
        receiving, from the target base station, a handover request acknowledge message informing that the WT is kept; and
        transmitting, to the WT, a WT release request message informing that the WT is kept,
    wherein the WT ID identifies the WT,
    wherein the WT XwAP ID is allocated by the WT and uniquely identifies the wireless device over the Xw interface,
    wherein the handover request message further includes a mobility set of the WT,
    wherein the mobility set is a set of one or more WLAN access points (APs) identified by one or more of a BSS identifier (BSSID), a home equivalent SSID (HESSID) or an SSID.

2. The method of claim 1, wherein the handover request message further includes information on E-UTRAN radio access bearers (E-RABs) for the WT.

3. The method of claim 1, wherein the handover request acknowledge message further includes a revised mobility set for the wireless device based on selection of the target base station.

4. The method of claim 1, wherein the WT release request message further includes at least one of an eNodeB (eNB) Xw AP ID, a WLAN Xw AP ID, or a cause to release.

5. A method for a target base station in a wireless communication system, the method comprising:
    establishing an Xw interface with a wireless local area network (WLAN) termination (WT), wherein the WT is a logical node that terminates the Xw interface, and wherein the Xw interface is also established between a source base station and the WT;
    and
    performing an inter-base station handover without WT change in which a wireless device currently connected to both the source base station and the WT is to be handed over from the source base station to the target base station while keeping connection with the WT, the inter-base station handover comprising:
        receiving, from the source base station, a handover request message including a WT identifier (ID) and WT XwAP ID;
        transmitting, to the WT, a WT addition request message including the WT XwAP ID;
        receiving, from the WT, a WT addition request acknowledge message; and
        transmitting, to the source base station, a handover request acknowledge message informing that the WT is kept,
    wherein the WT ID identifies the WT,
    wherein the WT XwAP ID is allocated by the WT and uniquely identifies the wireless device over the Xw interface,
    wherein the handover request message further includes a mobility set of the WT,
    wherein the mobility set is a set of one or more WLAN access points (APs) identified by one or more of a BSS identifier (BSSID), a home equivalent SSID (HESSID) or an SSID.

6. The method of claim 5, wherein the WT addition request message further includes at least one of an eNodeB (eNB) Xw AP ID, an E-UTRAN radio access bearer (E-RAB) ID, an E-RAB quality of service (QoS), an eNB GPRS tunneling protocol (GTP) tunnel endpoint, a data forwarding indication, a security key, a selected WLAN identifier or revised mobility set, or a WLAN media access control (MAC) address.

* * * * *